Figure 1:
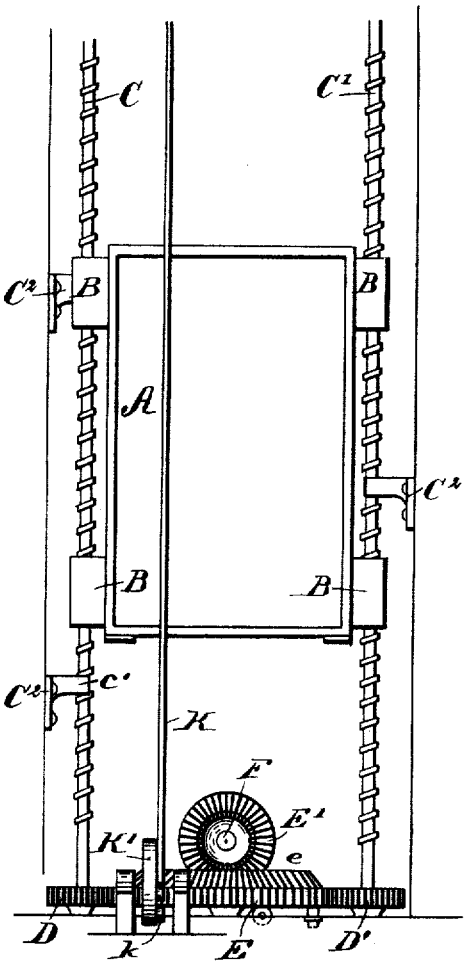

2 Sheets—Sheet 1.

E. T. YOUNG.

Assignor to W. Scott.

REVERSING MECHANISM FOR ELEVATORS.

No. 11,251. Reissued June 28, 1892.

WITNESSES

B. F. Mueller

O. B. Barringer

INVENTOR

Edward T. Young

By Edgar S. Mueller

Attorney.

THE NORRIS PETERS CO., PHOTO-LITHO., WASHINGTON, D. C.

2 Sheets—Sheet 2.
E. T. YOUNG.
Assignor to W. Scott.
REVERSING MECHANISM FOR ELEVATORS.
No. 11,251. Reissued June 28, 1892.
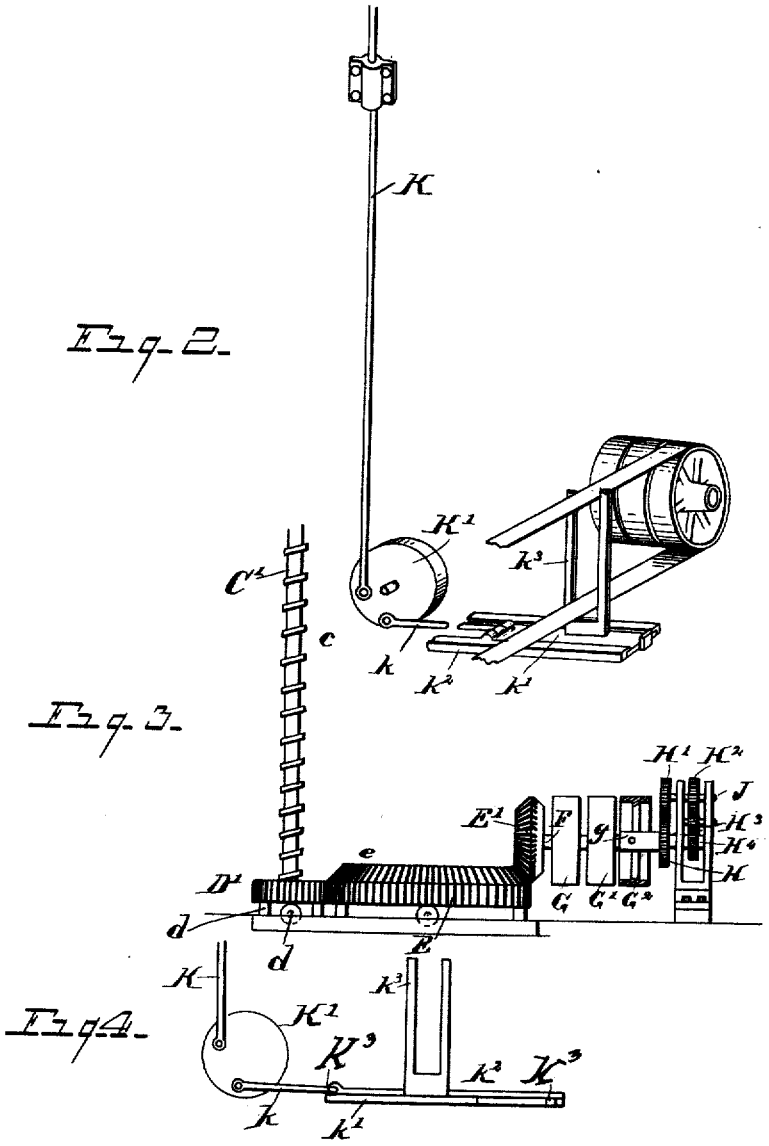
WITNESSES
B. A. Wheeler
O. B. Barringer.
INVENTOR
Edward T. Young
By Edgar S. Wheeler
Attorney.
THE NORRIS PETERS CO., PHOTO-LITHO., WASHINGTON, D. C.

UNITED STATES PATENT OFFICE.

EDWARD T. YOUNG, OF DETROIT, MICHIGAN, ASSIGNOR OF ONE-HALF TO WM. SCOTT, OF SAME PLACE.

REVERSING MECHANISM FOR ELEVATORS.

SPECIFICATION forming part of Reissued Letters Patent No. 11,251, dated June 28, 1892.

Original No. 428,196, dated May 20, 1890. Application for reissue filed February 23, 1892. Serial No. 422,583.

*To all whom it may concern:*

Be it known that I, EDWARD T. YOUNG, a citizen of the United States, residing at Detroit, in the county of Wayne and State of Michigan, have invented certain new and useful Improvements in Reversing Mechanisms; and I do declare the following to be a full, clear, and exact description of the invention, such as will enable others skilled in the art to which it appertains to make and use the same, reference being had to the accompanying drawings, and to the letters marked thereon, which form a part of the specification.

My invention relates to a reversing mechanism for elevators and other purposes where a reversal of motion is desired without reversing the engine; and it consists in the construction and combination of devices, hereinafter described and claimed.

In the drawings, Figure 1 is a side view of the elevator-shafts with the car thereon and the operating connections. Fig. 2 is a perspective view of the belt-shifting device. Fig. 3 shows the driving-gearing for revolving the shafts and the reversing mechanism. Fig. 4 is a side elevation of the belt-shifting device.

In the above drawings, A represents the car of the elevator.

B are what may be termed "sleeves," attached to the sides of the car, two at the top and two at the bottom. On the inner surfaces of these sleeves are journaled small wheels or rollers.

C C′ are two vertical shafts, between which the car A is adapted to travel. These shafts are provided with spiral tracks, and the sleeves B embracing the shafts the wheels or rollers will rest on said track, and thus the sleeves will support the car.

D D′ are gears rigidly engaged to the base of the shafts and adapted to revolve horizontally, being supported by the rollers *d*. Meshing with these gears D D′ is the horizontal gear E. This gear has on its upper surface the beveled pinion *e*, which meshes with the pinion E′, the latter being keyed to the shaft F.

G is a belt-pulley rigidly keyed to the shaft F.

G′ is a loose pulley on said shaft, and $G^2$ is another loose pulley on said shaft. The hub of the pulley $G^2$ is provided with gear H, which meshes with the pinion H′. This pinion H′ is keyed to the shaft J, as is also the pinion $H^2$. Meshing with the latter is the pinion $H^3$, and with this latter pinion meshes the gear $H^4$. This gear $H^4$ is keyed to the shaft F.

The operation will now be understood. The pulley G is revolved by belting. This will revolve the shaft F, and this shaft being geared to the vertical shafts C C′ the latter will be revolved, and thus carry the car upward. By shifting the belt to the loose pulley G′ the car will remain stationary, and by shifting the belt to the pulley $G^2$ the shafts will be revolved in the opposite direction, the motion of the shaft F being reversed through the action of the train of gears H, H′, $H^2$, $H^3$, and $H^4$ and the car lowered.

Fig. 2 represents the belt-shifting device, the shifting of the belt being accomplished by the rod K, extending from the base of the elevator-way up through the car to the top of the way. The lower end of the rod K is attached to the bell-crank K′, and the rod *k* is also attached thereto. The other end of the rod *k* is attached to the sliding piece *k′*, which works in the guides $k^2$. Mounted vertically on the piece *k′* are the arms $k^3$. These arms are adapted to extend up and embrace the belt.

The operation of the belt-shifting device is obvious. By raising the rod K the belt is shifted to the pulley G. By pushing the rod K down the belt is shifted to the pulley $G^2$.

$K^3$ are stops adapted to limit the play of the piece *k′*.

What I claim is—

1. A reversing mechanism for elevators consisting of the gears D D′, wheels rigidly attached to the base of the shafts, gear-wheels E E′, meshing therewith and adapted to actuate the same, and the pulleys G $G^2$, and gearing H H′ $H^2$ $H^3$ $H^4$, all adapted and arranged to rotate the wheel E in different directions at will without reversing the engine, substantially as described.

2. The combination of the driving-shaft, the fast pulley on said shaft near one end thereof, the gear fast on said shaft at its opposite end, the intermediate pulley G′, loosely mounted on said shaft, the loose gear H, attached to said loose pulley, the counter-shaft, the pinions H′ $H^2$, fast thereon, said pinion H′ meshing directly with the gear attached to the loose pulley, and the idle or transmitting pinion $H^3$, meshing with the pinion $H^2$ and with the fast gear on the driving-shaft, as and for the purpose specified.

In testimony whereof I affix my signature in presence of two witnesses.

EDWARD T. YOUNG.

Witnesses:

E. S. WHEELER,

H. R. WHEELER.

Correction in Reissue Letters Patent No. 11,251.

It is hereby certified that in Reissue Letters Patent No. 11,251, granted June 28, 1892, upon the application of Edward T. Young, of Detroit, Michigan, for an improvement in "Reversing Mechanism for Elevators," an error appears in the printed specification requiring the following correction, viz.: In line 2 page 2, the reference letter "$G^1$" should read $G^2$; and that the said Letters Patent should be read with this correction therein that the same may conform to the record of the case in the Patent Office.

Signed, countersigned, and sealed this 12th day of July A. D. 1892.

[SEAL.]

CYRUS BUSSEY,
*Assistet Secretary of the Interior.*

Countersigned:

W. E. SIMONDS,
*Commissioner of Patents.*